Patented Feb. 23, 1932

1,846,520

UNITED STATES PATENT OFFICE

ROBERT W. KALTENBACH, OF CLEVELAND HEIGHTS, OHIO

PLATEN LOCK FOR CAR DUMPERS

Application filed January 17, 1930. Serial No. 421,388.

This invention relates to car dumpers, which are used for dumping the contents of a railroad car by inverting the car while it is held within a cradle. One form of dumper heretofore used utilizes a platen, which carries the car supporting tracks, and which is adapted to be shifted with relation to the cradle until one side of the car engages the buffers against which it is held during the dumping operation. Counterweighted cables are adapted to engage at the top of the car, and are adapted to hold it on the tracks while it is in the inverted position. Frequently, a car will be so loaded however that lumps of coal will be caught between the cables and the top edge of the car, and will thereby prevent the cables from directly engaging the car. Then, as soon as the weight of the car is thrown onto the cables, the coal is crushed, with the result that the car is subjected to a jerk, which in some cases has caused the car to leave the rails. This leaves the platen free to move with reference to the cradle, so that when the car is jerked back, the wheels are out of registration with the tracks and the car is derailed.

One form of mechanism heretofore used for holding the platen against movement with relation to the cradle under the conditions described has comprised a rack and a pawl, which is adapted to coact therewith and to lock the platen in the desired position. Such apparatus is not only expensive however, but is not foolproof, as there is a likelihood of the pawl failing to engage the rack tooth at the desired time due to lost motion between the pawl and rack tooth.

One of the objects of the present invention therefore, is the provision of a simple device, which will effectively lock the platen against movement with relation to the cradle, while the cradle is tilted even though the car wheels should leave the rails momentarily during the dumping operation. A further object is to make a device, which will be fool-proof in operation, and which will be more economical to manufacture and assemble than any device heretofore used.

Figure 1:
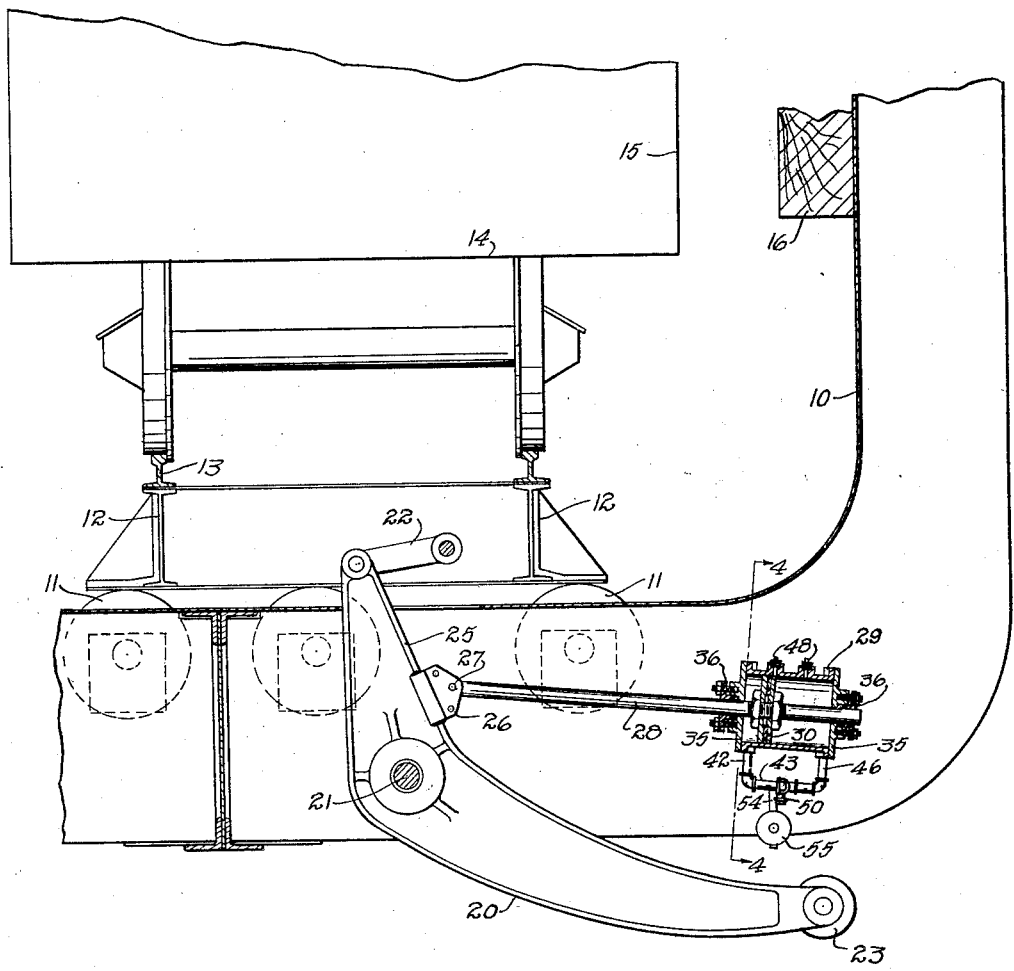
Figure 2:
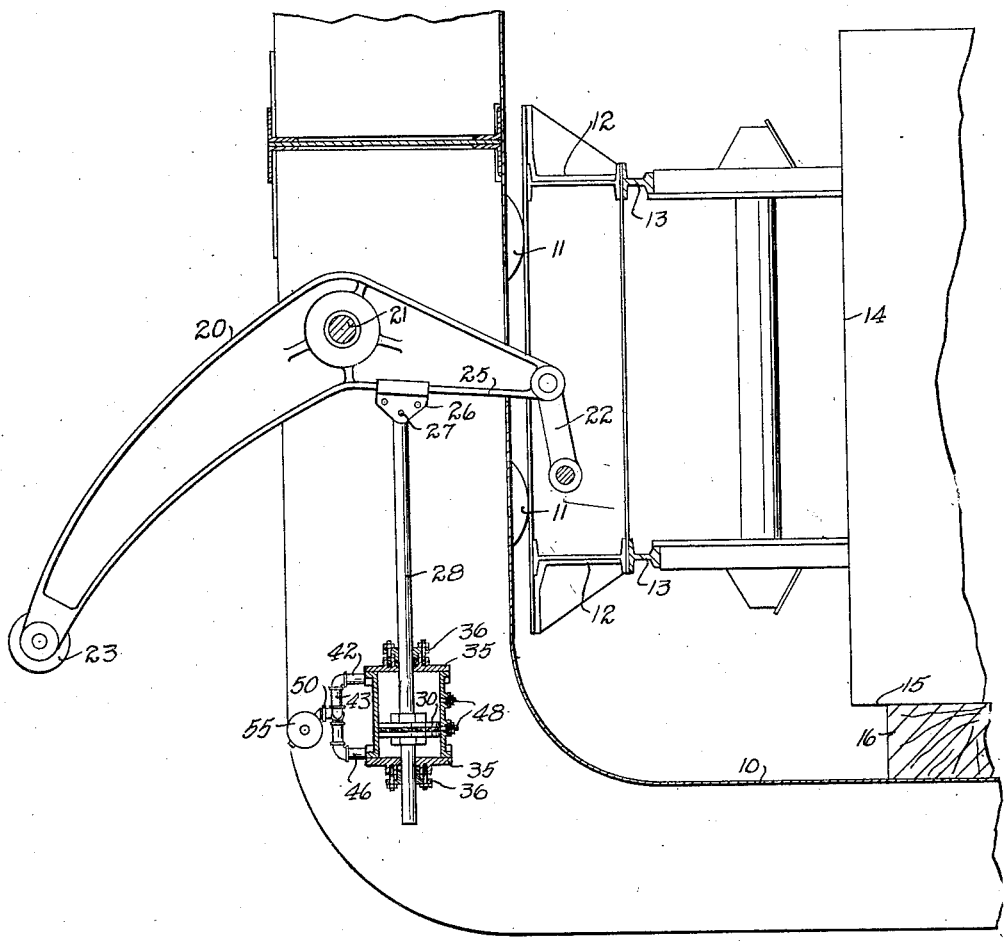
Figure 3:
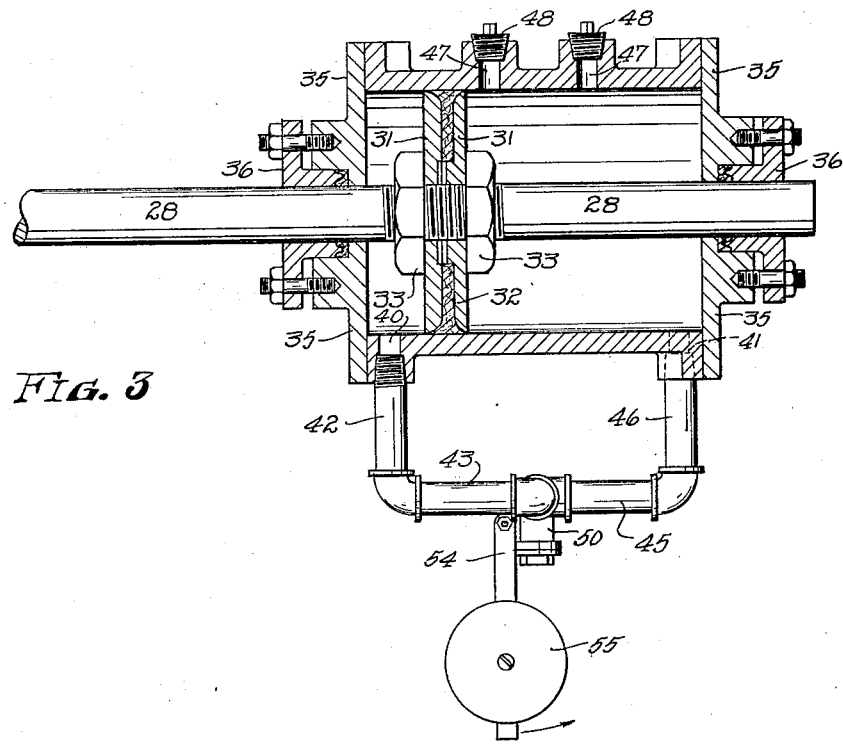
Figure 4:
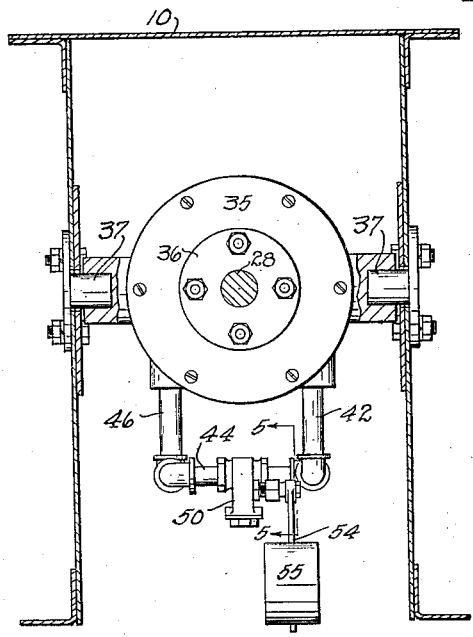
Figure 5:
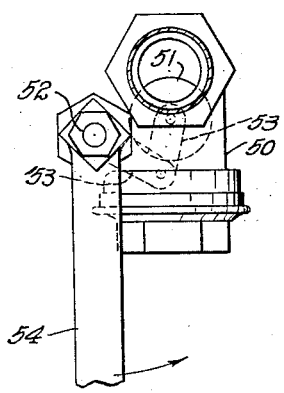

Referring now to the drawings. Fig. 1 is a vertical transverse section through the cradle part of a car dumper, showing my invention applied thereto; Fig. 2 is a similar section showing the cradle in inverted position; Fig. 3 is an enlarged sectional view through this device; Fig. 4 is a section taken on the line 4—4 in Fig. 1; Fig. 5 is a section taken on the line 5—5 in Fig. 4.

My invention is shown in connection with a car dumper having a cradle 10 which may carry rollers 11 on which a platen 12 is supported. The platen is shown as having tracks 13, on which a car 14 is adapted to be supported during the dumping operation. Normally, the platen in the position shown in Fig. 1 has the tracks in registration with the approach and run-off tracks (not shown) respectively. In such position, the side 15 of the car is out of contact with the buffer 16 on the cradle. During the initial movement of the tilting operation, the platen is moved laterally until the side of the car engages the buffer. The present invention is not concerned with the mechanism for effecting such lateral movement, but is concerned with means for securely locking the platen against further movement after the side of the car engages the buffer.

One form of mechanism which has been found to be satisfactory for returning the platen to the normal position at the end of the tilting operation, utilizes a bell crank lever 20 which is pivoted immediately at 21 to the cradle. One end of the lever is pivotally connected at one end thereof, as by a link 22 to the platen, while the other end is provided with a roller 23 for engagement with an abutment (not shown).

My invention provides an operative connection between the cradle and the platen which permits the relative movement at the desired time, as for example at the start, and at the end of the tilting operation, but prevents return motion while the car is inverted. A convenient place to provide such connection is between the cradle and that part of the bell crank, which forms the arm 25. Accordingly, in Fig. 1, I have shown a bracket 26 which is rigidly mounted on the arm 25 and which is pivotally connected at 27 to a rod 28 which in turn extends through a cylinder 29. The rod carries a piston 30, which as shown more particularly in Fig. 3, comprises two-cupped shaped washers 31, which are fastened back to back and on opposite sides of a plate 32. Securing members 33 are adapted to be threaded onto the rod so as to adjust the piston initially at the proper point with relation to the cylinder. The ends of the cylinder are preferably closed by removable plates 35 which art provided with openings, through which the rod extends, and which are each provided with a stuffing box 36. The cylinder as shown in Fig. 4 is mounted for oscillation with reference to the cradle upon trunnions 37. This allows compensating movement of the cylinder, with reference to the cradle, while the bell crank lever is moving about the pivot 21 during the necessary movement of the platen with reference to the cradle.

The interior of the cylinder on each side of the piston is filled with liquid, such as oil, or glycerine, and provision is made for the liquid to flow from one side of the piston to the other during the period of desired platen movement. To this end, an opening 40 is shown at one end of the cylinder and a corresponding opening 41 is shown at the opposite end. These openings are connected, preferably externally of the cylinder, by a conduit which extends downwardly as at 42 from the opening 40, thence lengthwise of the cylinder as at 43, then transversely as at 44, thence again longitudinally as at 45, and upwardly as at 46, where it is again connected to the cylinder in communication with the opening 41. Liquid may be introduced into the cylinder through openings 47 which are normally closed by plugs 48.

Within the transverse reach of the conduit, I provide a valve indicated in general at 50 which when open permits the flow of liquid from one side of the piston to the other side thereof, and which when closed prevents the flow of liquid, and thereby locks the piston against movement with relation to the cylinder. When so locked, the platen is locked against movement with relation to the cradle.

The valve which I have illustrated is one which is shown and described in Letters Patent of the United States No. 627,140 issued June 20, 1899 to James Powell. Briefly, such valve comprises an enclosing shell 50 having oppositely disposed fluid passageways which are adapted to be closed by a pair of valve discs 51, that are adapted to be moved transversely of the passageways upon oscillation of the pin 52, which is journalled in the shell. To this end, the pin is connected to the discs by a suitable linkage indicated at 53, and is adapted to be oscillated upon movement of the arm 54. I arrange this valve and its associated mechanism, so that the arm 54 normally hangs substantially vertically, when the platen is in the normal position of rest, and I utilize a weight 55 on the arm to maintain the arm in such normal position. As the tilting operation of the cradle is in progress, the weighted arm swings about the axis of the pin 52 in the direction indicated by arrows in Figs. 4 and 5 and thereby moves the valve discs to closed position, and effectively stops the flow of liquid through the conduit.

Fig. 1 shows the position of the valve operating arm when the cradle is in the normal position. Upon initial movement of the cradle, the platen is moved laterally until the car engages the buffer, and until all of the sidewise slack motion is taken up between the tracks and the platen. Fig. 2 shows the position of the arm when the cradle is inverted ninety degrees, at which time the valve is closed. The closing operation occurs gradually during the tilting operation, while the platen is retained in place by the car. As soon as the valve is closed, the platen is locked against further movement with relation to the cradle, wherefore continued tilting movement of the cradle throws the weight of the car upon the counterweight cables. If during such time, the car is subjected to a jerk, sufficient to cause the wheels to leave the rails, the platen is locked against movement so that the rails will not be thrown out of registration with the wheels. Normally then the wheels will return to the tracks, as all sidewise slack movement of the trucks will have been previously taken up before the platen will have been locked.

From the foregoing description, it is obvious that my invention provides a simple and effective hydraulic means for permitting necessary movement of the platen with reference to the cradle at the desired time, and yet automatically locks it against such relative movement while the car is inverted. It is obvious moreover, that the locking can be effected without the occurrence of any lost motion between the platen and cradle. This, therefore, eliminates the possibility of the platen being free to move out of position after being released from pressure due to the force exerted by the weight of the car, load and trucks upon the crushing of a lump of coal which may have been lodged between the car and cable.

I claim:

1. In a car dumper, the combination with a tiltable cradle, of a car supporting platen movably mounted thereon, a fluid circuit mounted on the cradle, a piston movable within the circuit, means for connecting the piston to the platen, and other means for interrupting the flow of fluid in said circuit, whereby the piston is locked against movement with reference to the cylinder.

2. In a car dumper, the combination with a tiltable cradle member, of a platen member, a fluid conduit including a cylinder on one of said members, a weighted arm pivotally mounted on said conduit and adapted to be moved during the tilting of the cradle, a valve in the conduit controlled by the movement of the arm, a piston within the cylinder, and means for connecting the piston to the platen.

3. In a car dumper, the combination with a tiltable cradle, of a car supporting platen mounted thereon, and movable with relation thereto, and means including a cylinder, a piston and a hydraulic circuit for locking the platen against movement with relation to the cradle during the tilting operation, and a valve in said circuit for automatically releasing the platen at the end of the tilting cycle.

4. In a car dumper, the combination with a cradle member, of a platen member, a cylinder carried by one of said members, a piston movable within the cylinder, means connecting the piston to the other of said members, the cylinder being filled with liquid, and having a passageway associated therewith for permitting the liquid to flow from one side of the piston to the other side thereof, a valve in said passageway, and means for actuating the valve to stop the flow of liquid through said passageway, whereby the platen may be locked against movement with reference to the cradle.

5. In a car dumper, the combination with a cradle member, of a platen member movably mounted thereon, a cylinder pivotally mounted on one of said members, a piston movable within the cylinder, means connecting the piston with the other of said members, said cylinder being filled with liquid, and having a passageway for the liquid from one side of the piston to the other side thereof, a valve in said passageway and means for automatically closing the valve at predetermined times in the cycle of cradle movement, whereby the flow of liquid may be stopped, and the platen thereby locked against movement with reference to the cradle.

6. In a car dumper, the combination with a cradle member of a car supporting platen member movable thereon, a cylinder pivotally mounted on one of said members, a piston pivotally connected to the other of said members, and movably mounted within the cylinder, said cylinder being filled with liquid and having a passageway providing communication for the liquid from one side of the piston to the other side thereof, a valve in the passageway, and means for automatically closing the valve at a predetermined point in the initial period of cradle tilting operation, and for automatically opening the valve at a predetermined point at the end of the cradle tilting operation.

7. In a car dumper, the combination with a cradle member, of a platen member movably mounted thereon, a cylinder connected to one of said members, a piston connected to the other of said members and movably mounted within the cylinder, the cylinder being filled with liquid, means for conducting the liquid from one side of the piston to the other side thereof, and means operable by movement of the cradle for stopping the flow of liquid in said conducting means, whereby the cradle and platen are locked against relative movement.

8. In a car dumper, the combination with a cradle, of a platen movably mounted thereon, an arm pivotally mounted on the cradle and connected to the platen for moving the platen with reference to the cradle at predetermined times during the movement of the cradle, a cylinder pivotally mounted on the cradle, a piston reciprocable therein, means for connecting the piston to the arm, the cylinder being filled with liquid, a conduit for conducting the liquid from one side of the piston to the other side thereof, a valve in said conduit, and gravity actuated means for opening and closing the valve at predetermined points in the movement of the cradle.

In testimony whereof, I hereunto affix my signature.

ROBERT W. KALTENBACH.